United States Patent [19]
Nagahori et al.

[11] 3,771,125
[45] Nov. 6, 1973

[54] ERROR CORRECTING SYSTEM OF A MAGNETIC TAPE UNIT

[75] Inventors: Tetuo Nagahori, Shimoasao, Kawasaki; Kaoru Kanda, Midori-ku, Yokohama, both of Japan

[73] Assignee: Fujitsu, Limited, Kamikodanaka, Kawasaki, Japan

[22] Filed: Dec. 27, 1971

[21] Appl. No.: 212,203

[30] Foreign Application Priority Data

Dec. 28, 1970 Japan ............................ 45/127971

[52] U.S. Cl. ................ 340/146.1 F, 340/146.1 BA
[51] Int. Cl. ........................................... G06f 11/10
[58] Field of Search ........... 340/146.1 BA, 146.1 F, 340/174.1 B

[56] References Cited

UNITED STATES PATENTS

| | | | |
|---|---|---|---|
| 2,913,707 | 11/1959 | Goldberg et al. | 340/174.1 B |
| 2,937,368 | 5/1960 | Newby | 340/174.1 B |
| 3,460,090 | 8/1969 | Eriksson | 340/146.1 BA |
| 3,490,013 | 1/1970 | Lawrance et al. | 340/174.1 B |

OTHER PUBLICATIONS

Luhns, Write-Check Gaps, IBM Technical Disclosure Bulletin, Vol. 13, No. 10, March 1971.

*Primary Examiner*—Charles E. Atkinson
*Attorney*—Staas, Halsey & Gable

[57] ABSTRACT

An error correcting system is disclosed for use with a suitable information storage medium such as magnetic tape, whereon at least a data block, a tape mark block and an interblock gap are stored. In particular, the error correcting system operates to provide a write instruction to effect the recording of a tape mark block on the magnetic tape by a suitable write head, to retrieve or read by a suitable read head the previously recorded tape mark block, to detect errors in the recording of the tape mark block and upon error detection, to reverse the direction of the magnetic tape and direct the magnetic tape in the reverse direction for a first predetermined length, to continue to move the magnetic tape in the reverse direction for a second predetermined length while erasing this portion of the magnetic tape and to rewrite a new tape mark block, thus avoiding that portion of the magnetic tape whereat the tape mark block in error was written.

6 Claims, 12 Drawing Figures

ERROR CORRECTING SYSTEM OF A MAGNETIC TAPE UNIT

BACKGROUND OF THE INVENTION

1. Field of the Invention

This invention relates to information storage systems and in particular to an error correcting system for detecting and correcting errors upon a suitable storage medium such as magnetic tape.

2. Description of the Prior Art

It is known in the art to record information in a binary fashion in which characters or other information may be recorded in terms of 1 and 0. More specifically, a character may be recorded upon a suitable storage medium such as magnetic tape in the form of a group (hereinafter referred to as a "byte", but which is often described in the art as a "character") of bits, which bits take the form of 1 or 0. Typically, the byte of information may be recorded upon a plurality of distinct tracks of the magnetic tape. In particularly, each bit of the binary information is recorded upon a separate track of the magnetic tape. Thus, the information bits of a byte may be read out simultaneously and sensed to indicate a particular alpha-numeric character or other qantum of information.

Typically, bytes of the information data are recorded on a magnetic tape in a further grouping termed "data blocks". Further, a magnetic tape includes a tape mark block recorded thereon and an interblock gap (IBG) disposed between the data block and the tape mark block and between a data block and an adjacent one, where no data is recorded. The tape mark block is recorded at the end of the file to identify a group of ten's or hundred's of such blocks, and illustratively comprises two bytes (or characters) comprising a first byte composed of specified bits and a second byte redundant or similar to the first byte. A signal, termed a write tape mark instruction, will be generated within the information storage system to cause a tape mark block to be stored or written on the magnetic tape.

It is desired to distinguish information to be recorded in a data block from noise, and this object is accomplished by recording a minimum number of bytes together as a data block. In that portion of the magnetic tape, where no useful data has been recorded, noise will be generated by scars, dust, etc., disposed on the magnetic tape. This noise, in turn, will generate electrical signals in the read heads of the information sotrage system and these signals will be detected as a block of several bytes. These blocks are termed "noise blocks" and have no meaning as processed information.

In order to retrieve information from the magnetic tape, the information storage system will generate suitable read instructions. When a block is determined to have less than the specified number of bytes by the information storage system, a signal termed a "space instruction" will be generated to direct the magnetic tape a length corresponding to one block in the forward or normal direction and then to generate a signal, termed a "back space instruction", to direct the magnetic tape "one" block in the reverse direction. If this block is determined not to be a tape mark block, the information storage system considers this block to be a noise block; thus, the information storage system will stop reading the next block of this noise.

Tape mark blocks may not be correctly detected because the signal, termed a "tape mark instruction", is erroneously generated or the correctly wirtten tape mark block was not accurately read by the tape mark heads. Typically, the information storage system checks whether the tape mark has been accurately recorded immediately after it has been written (or stored) upon the magnetic tape. If the error correction procedures of the prior art as described above are used, a noise block, which may be composed of two bytes, may not be detected and may be left upon the magnetic tape as a tape mark block. Errors, i.e., noise, may appear as a tape mark block and are caused by scars or dust, or an oblique movement of the magnetic tape. In order to process and correct such errors, that portion of the magnetic tape in which the tape mark block should be written is erased and a write tape mark instruction is generated to record a correct tape mark block in another portion of the magnetic tape spaced from that just erased. To accomplish the desired erasure, a signal, i.e., a back space instruction will be generated to direct the magnetic tape to its previous position; thereafter another tape mark instruction will be given. The problem, however, arises when the magnetic tape has been brought to its previous position. More specifically, in a check-read system, where data is first recorded by a suitable record head and then checked by a second reading head, it is more difficult to detect errors caused by the oblique motion of the magnetic tape. Therefore, it may occur that if the cause of error is determined to be the result of scars or dust, i.e., a noise block, the magnetic tape will be backspaced on the next block. However, if the cause is detected to be of a recovery type, such as is due to an oblique motion of the magnetic tape, the information storage system may detect the error as a normal tape mark block. In this case, the magnetic tape will be stopped at a different position from that mentioned above. Thus, possibly more bytes will be wirtten upon the magnetic tape than if a general write instruction was given to write a specified number of bytes, even though an error is detected on the way; in this case, an instruction will be given to stop and to backspace without determining this block as a noise block. In order to implement such an error correcting procedure, the system will need to supply a write tape mark instruction that is complex in that a stop position with a space instruction is not constant. Thus, in the systems of the prior art, the error processing to detect an erroneous tape mark, has the above-mentioned defects in that incorrectly detected or written tape marks may be judged to be either a noise block or a tape mark block; thus, the reliability of the data processing of such information storage systems has been decreased. Further, complex software may be needed to transfer special information to execute the processing procedures.

SUMMARY OF THE INVENTION

It is therefore an object of this invention to overcome the above-identified difficulties in error processing.

It is a further object of this invention to improve the reliability of detecting errors in recording and/or reading tape marks by an error detection system.

In accordance with these and other objects of this invention, the teachings of this invention are accomplished by providing a method and apparatus for transporting a suitable information storage medium such as a magnetic tape, and means for providing a write instruction to write (or to store) an information quantum on the magnetic tape, which includes at least a data block, a tape mark block and an interblock gap. Further, there are included means for reading or retrieving the tape mark block from the magnetic tape and determining whether the tape mark was erroneously recorded or read out, and means responsive to the detection of error for returning the magnetic tape by a first predetermined length in a reverse direction for continuing to direct the magnetic tape in the reverse direction for a second predetermined length thereof while erasing this portion. Finally, means are provided for then directing the magnetic tape in the forward direction and for recording a new or second tape mark block, thus avoiding that portion of the magnetic tape where the erroneous tape mark block was originally written.

BRIEF DESCRIPTION OF THE DRAWINGS

In the detailed description of the preferred embodiment of this invention presented below, reference is made to the accompanying drawings in which.

DETAILED DESCRIPTION OF THE INVENTION

Figure 1:
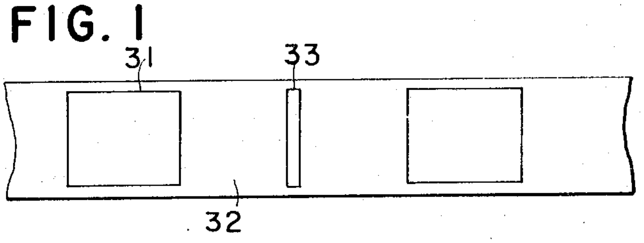
FIG. 1 is a view of a portion of a suitable information storage medium such as a magnetic tape.

With reference to the drawings and in particular to FIG. 1, there is shown a suitable information storage medium such as a magnetic tape. In particular, the magnetic tape includes a data block 31 and a tape mark block 33 with an interblock gap (IBG) 32, disposed therebetween.

Figure 2:
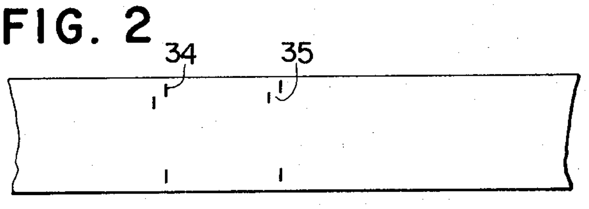
FIG. 2 is a view of an enlarged portion of the magnetic tape shown in FIG. 1, illustrating a tape mark block.

With regard to FIG. 2, there is shown an enlarged portion of the magnetic tape and in particular the tape mark block 33. The tape mark block 33 includes a first byte generally indicated by the number 34 and is composed of selected bits. Further, a second, or redundant byte 35 is written a spacing of several bytes from the first byte 34. As indicated in FIG. 2, the second byte 35 includes substantially the same bits of information as the first byte 34.

Figures 3, 4:
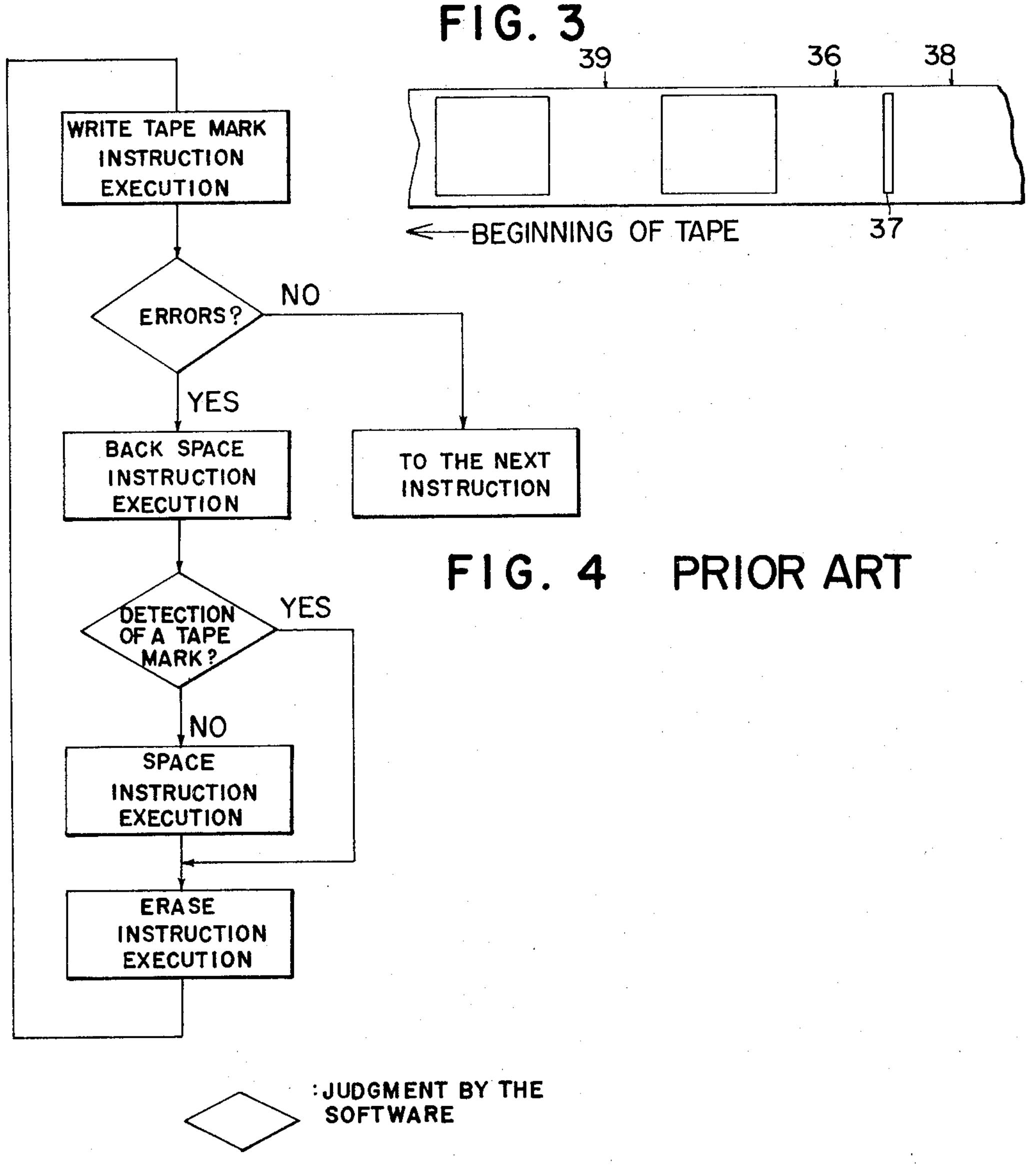
FIG. 3, FIG. 4 PRIOR ART
FIG. 3 is a view of the magnetic tape shown in FIG. 1 illustrating the relative position of a head in each sequence of a method of error processing with a write tape mark instruction.
FIG. 4 is a flow chart of a method of error processing in accordance with the teachings of the prior art.

With regard to FIG. 3, there are shown positions in which a head is disposed in a method of error processing after a write tape mark instruction has been given in accordance with the teachings of this invention. The tape mark block, which has been erroneously written or failed to be written upon the magnetic tape, is indicated by the character 37. The position of the head after executing a write tape mark instruction is indicated by the character 38. Further, the head is disposed in a position indicated by the character 36 before executing a write tape mark instruction. The head will be disposed upon detection of the missed tape mark block 37 in a reverse direction to the position indicated by the character 36, where it will be brought to a stop. However, if the block indicated by the character 37 is detected and considered by the information storage system to be a noise block, the magnetic tape will be driven in the reverse direction to dispose the head at a stop position indicated by the character 39.

FIG. 4 is a flow chart indicating the method of error processing when a write tape mark instruction has been executed, in accordance with the prior art. This flow chart is believed to be self-explanatory.

Figure 5:
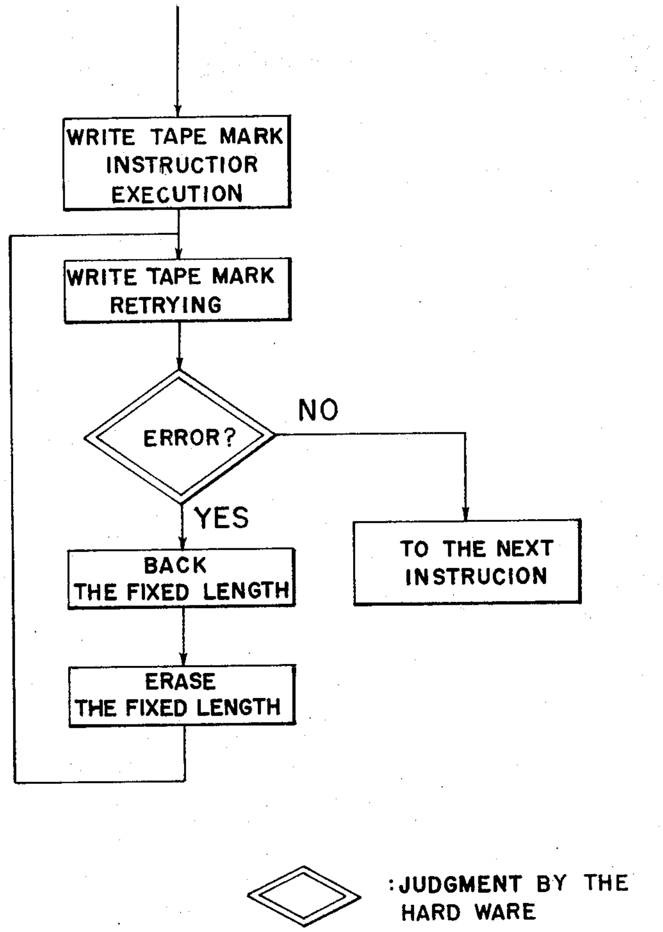
FIG. 5 is a flow chart of a method of error processing in accordance with the teachings of this invention.

With regard to FIG. 5, there is shown a flow chart of a method for error processing to detect an erroneously recorded or read tape mark in accordance with the teachings of this invention. If an error was detected after a write tape mark instruction has been executed, the magnetic tape will be directed in a reverse direction for a predetermined length of the magnetic tape. With regard to FIG. 3, the predetermined length of the magnetic tape corresponds to the spacing between the positions 38 and 36. By repeating the process indicated in FIG. 5 several times, it is possible to avoid an error generated by scars or dust disposed upon the magnetic tape, except in those situations where there is an abnormal failure in the information storage system (i.e., hardware). Further, the number of repeated cycles is counted (step not indicated in FIG. 5), so that after a predetermined number of such cycles, an indication that the system or hardware has failed will be given.

Figure 6:
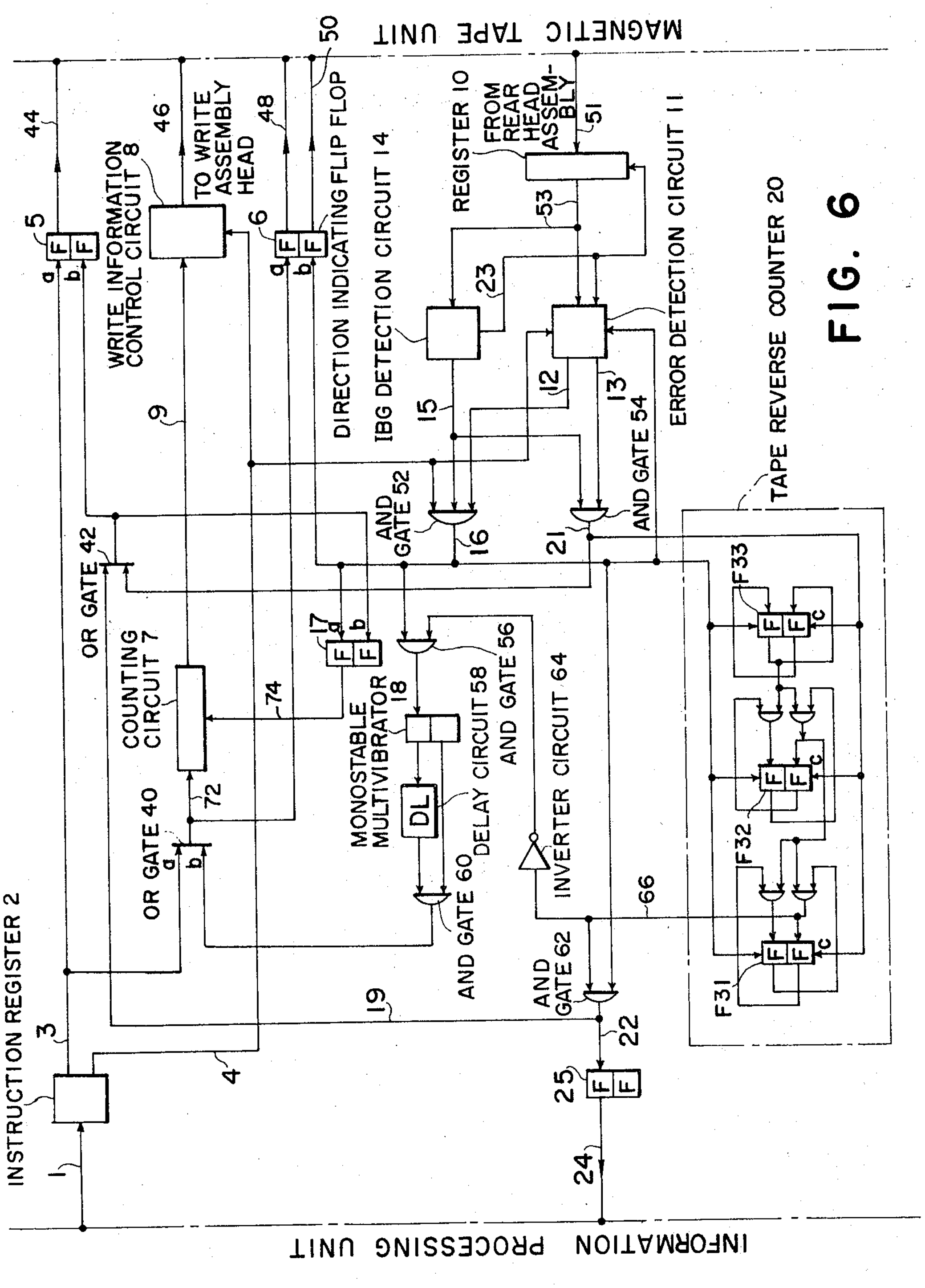
FIG. 6 is a schematic representation of an information storage system capable of correcting errors in accordance with the teachings of this invention.

In FIG. 6 there is shown a schematic of an information sorage and retrieveal system incorporating the error detection process in accordance with the teachings of this invention. Initially, a signal will be generated indicative of a write tape mark instruction and will be applied along conducted path 1 to an instruction register 2; as a result the instruction register 2 will be set to thereby provide a signal indicative of the write tape mark constructure upon conductive path 4 and also to generate a pulse indicating the rise of this signal upon a conductive path 3.

Figure 7:
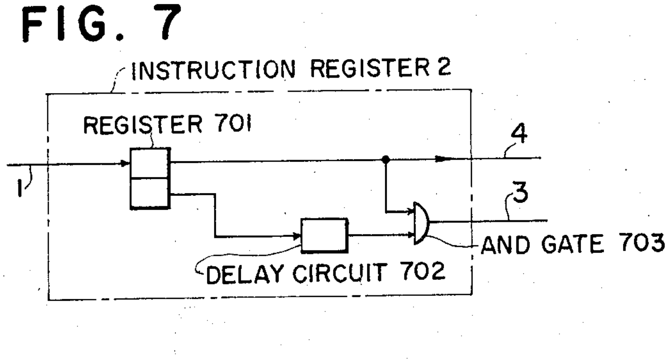
FIG. 7 is a schematic representation of a detailed embodi-ment of the instruction register 2 incorporated in the circuit of FIG. 6.

In FIG. 7 there is shown a schematic diagram of a detailed embodiment of the instruction register 2 shown in FIG. 6. More specifically, instruction register 2 includes a register 701 which is set in response to the tape mark instruction signal applied to the conductive path 1. Upon being set, the register 701 generates the signal on the conductive path 4 indicative of the write tape mark instruction. A pulse indicative of the rise of this signal will be generated by a delay circuit 702 and AND gate 703 to be applied to the conductive path 3.

With regard to FIG. 6, the pulse generated by the instruction register 2 will be applied through the conductive path 3 to the input terminal *a* of a flip flop 5, thereby setting the flip flop 5. The pulse generated by the instruction register 2 is applied to an OR gate 40 to the *a* input terminal of a direction indicating flip flop 6, thereby setting flip flop 6. Upon being set, the flip flop 5 applies a signal to a conductive path 44, which in turn is connected to a suitable transport (not shown) for moving the magnetic tape. The output terminals of the flip flop 6 are respectively connected by a pair of conductive paths 48 and 50 to the tape transport for selectively controlling the direction in which the magnetic tape is driven. In particular, the flip flop 6 upon being set, provides a signal for motivating the magnetic tape in a first or forward direction and upon being reset, to provide a signal for driving the magnetic tape in a second or reverse direction opposite to the first direction. In reponse to the application of the write tape mark instruction to the circuit of FIG. 6, the magnetic tape will be driven in a normal or forward direction.

Further, the pulse generated by the instruction register 2 upon the conductive path 3 will also be applied to a counting circuit 7 to thereby dispose the counting circuit 7 in a "driving status". Further, the counting circuit 7 generates and applies a timing signal through a conductive path 9 to control the start of operation of a write information control circuit 8. Thus, the counting circuit 7 serves to time or control the interval between the start of driving the magnetic tape and the wiring of a tape mark block upon the magnetic tape.

Figure 8:
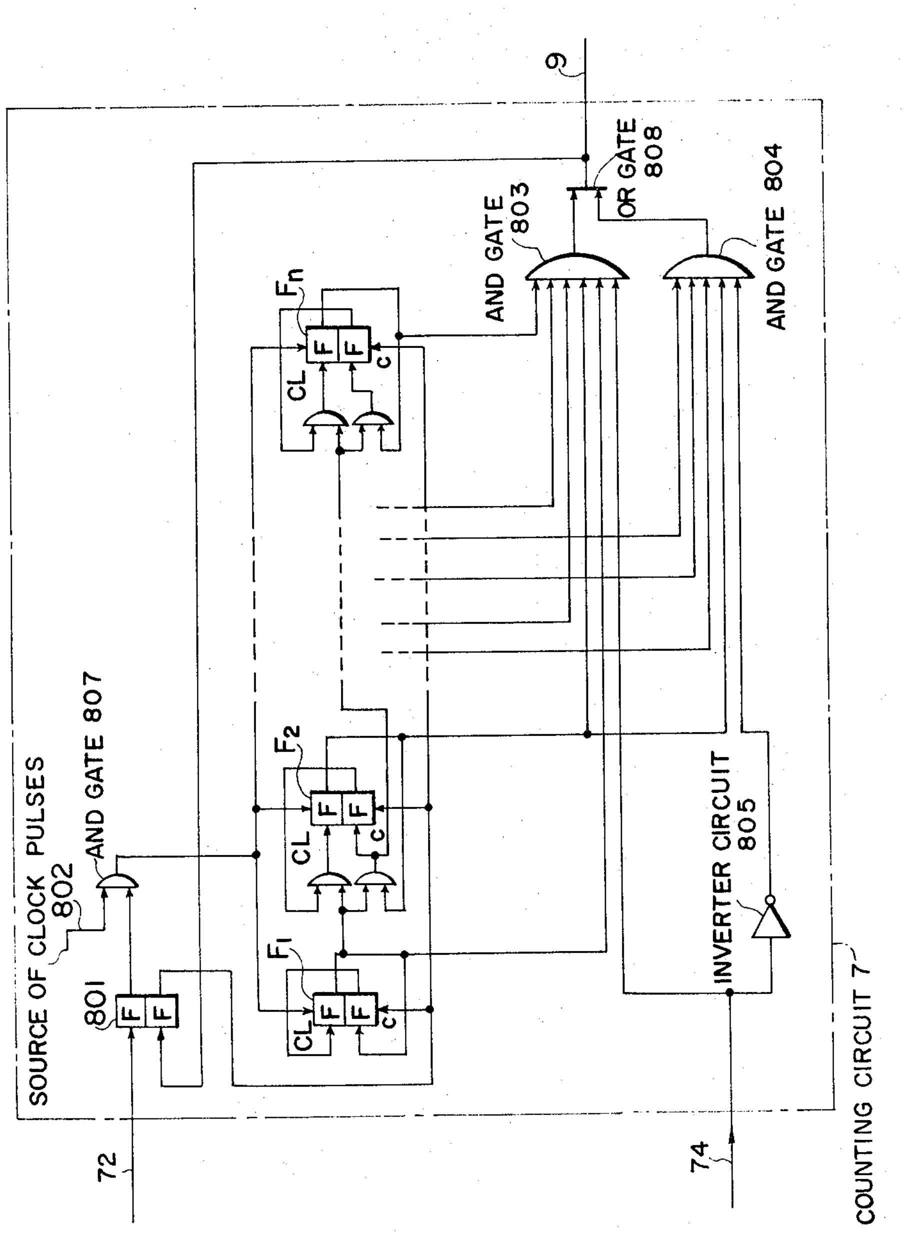
FIG. 8 is a schematic representation of a detailed embodi-ment of counting circuit 7 incorporated into the circuit shown in FIG. 6.

In FIG. 8, there is shown an illustrative embodiment of the detailed circuit of the counting circuit 7 as shown in FIG. 6. The first occurrence of the write tape mark instruction as well as the repeated attempts to write a tape mark as a result of detection of errors, will set a flip flop 801. More specifically, as explained above, a pulse will be generated by the instruction register 2 and applied through the conductive path 3 to the *a* input terminal of an OR gate 40 to thereby apply a reset signal through a conduc-tive path 72 to the flip flop 801. In a similar manner to be explained in detail later, the failure of the tape mark block to be recorded or to be read coreectly will generate an error condition which will cause an appropriate signal to be applied to the *b* input terminal of the OR gate 40 which in turn will apply a signal along the conductive path 72 to set the flip flop 801. As shown in FIG. 8, the counting circuit 7 includes a plurality of flip flops $F_1$, $F_2$ – $F_N$each having a clock terminal CL to which a count signal is applied by the output of an AND gate 807. More specifically, a source of a clock pulse is applied through a conductive path 802 to the first input of the AND gate 802 and upon being reset, the flip flop 801 applies a signal to the other input of AND gate 807. Therefore, the flip flops $F_1$, $F_2$ – operate to count each clock pulse applied to the conductive path 802, while the flip flop 801 is disposed in a reset condition. The output terminals of flip flops $F_1$, $F_2$ – $F_N$, provide a logic 1 signal when these flip flops are disposed in their set (or reset) condition, and are connected to AND gates 803 and 804, which act as decoders. When appropriate signals are applied to each of the input terminals of the AND gates 803 and 804, an appropriate signal will be generated and applied to OR gate 808, which responds to signals derived from either AND gate 803 or 804 to generate and apply a start timing signal through the conductive path 9 to write information control circuit 8 as shown in FIG. 6. As seen in FIG. 8, the start timing signal aslo serves to reset the flip flop 801, which in turn applies an appropriate signal to the clear input terminals C of each of the flip flops $F_1$, $F_2$, – $F_N$ whereby these flip flops are are reset. As explained above, the instruction register 2 applies a tape mark write signal to both the flip flop 5, and the counting circuit 7, to set flip flop 5 thereby driving the magnetic tape and also to initiate the operation of the counting circuit 7. The counting circuit controls the time delay between the start of the magnetic tape drive and the generation of a start timing signal. There is a difference in the operation between the first cycle after the initial tape mark write instruction and subsequent cycles after an error has been detected. As a result, the two AND gates 803 and 804 are required to generate respectively the start timing signal during the first cycle and the subsequent cycles. As will be explained later, the circuit of FIG. 6 includes a flip flop 17 which is reset upon the detection of an error signal to apply a suitable signal through a conductive path 74 to the counting circuit 7. As indicated in FIG. 8, the conductive path 74 is connected to one input terminal of the AND gate 803 to cause the AND gate 803 to generate a start timing signal during the first or initial cycle of operation. When the flip flop 17 is reset in response to detection of an error condition, a signal is applied through the conductive path 74 and an inverter circuit 805 to one input terminal of the AND gate 804, whereby the AND gate 804 generates a start timing signal during subsequent cycles. It is evident that a modification of the counting circuit shown in FIG. 8 could be made so that the timing interval may be determined by the counting circuit 7 after the generation of the tape driving signal, dependent upon the velocity of the magnetic tape, or other characteristics of the magnetic tape unit.

Figure 9:
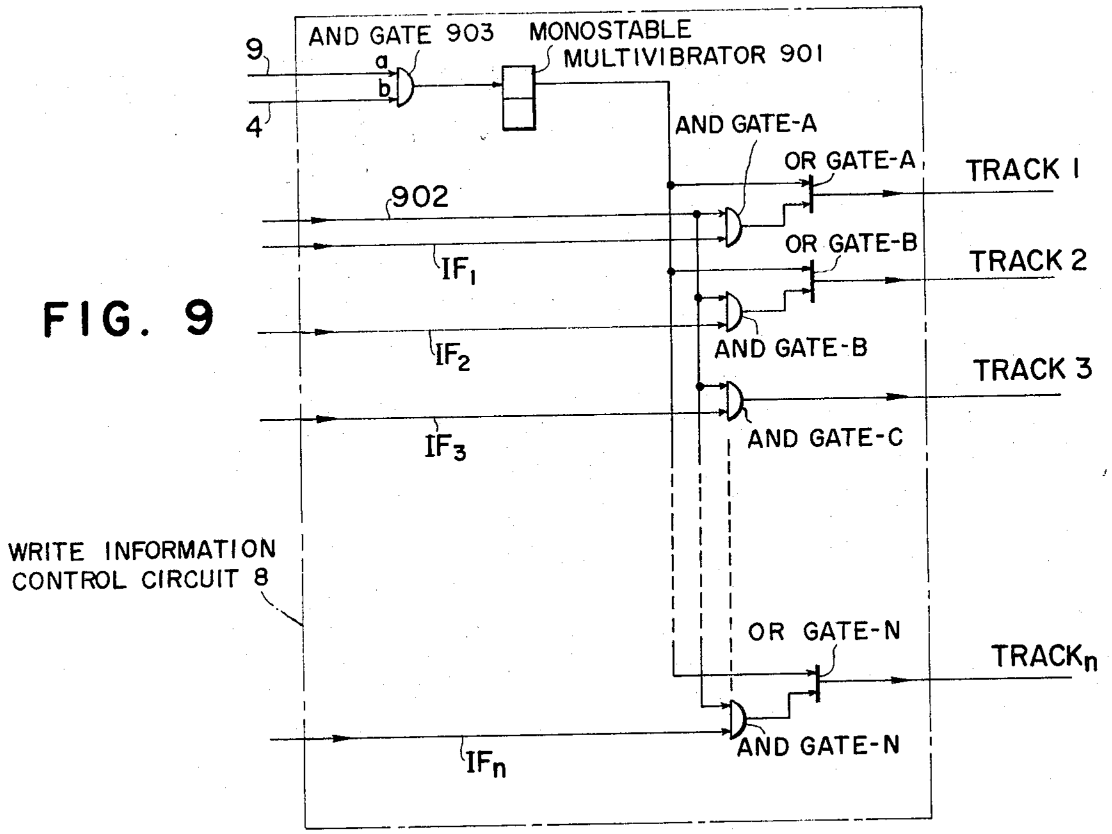
FIG. 9 is a schematic representation of a detailed embodi-ment of the write information control circuit 8 incorporated into the circuit shown in FIG. 6.

With reference to FIG. 6, a write information control circuit 8 operates to selectively gate bits of information to be applied to the write heads associated with the tape transport and to write the first tape mark byte and the redundant or second tape mark byte in response to the timing signal derived from the timing counter 7 and the pulse provided from the instruction register 2. In FIG. 9, there is shown an illustrative embodiment of a detailed circuit of the write information control circuit 8 incorporated into the circuit shown in FIG. 6. The write information control circuit 8 includes an AND gate 903, having an input terminal *b* to which a signal indicative of the tape mark instruction is applied, and an input terminal *a* to which a write start timing signal is applied after an interval of time determined by the counting circuit 7 as explained above. In response to these signals, the AND gate 903 generates and applies a signal indicating the write tape mark instruction to initiate the operation of a monostable multivibrator 901. As shown in FIG. 9, the output signal derived from the monostable multibibrator 901 is applied selectively to OR gates A,B and N, each respectively connected to the write heads associated with tracks 1, 2 and N of the magnetic tape, in response to the signal generated by the AND gate 903, the monostable multivibrator generates a pulselike signal; the rise and fall of this signal causes the OR gates A, B and N to energize the read heads to write the first tape mark byte and the second or redundant tape mark byte on the magnetic tape, respectively. With respect to FIGS. 2 and 9, it is noted that the tape mark bytes in this illustrative embodiment consists of bits written upon tracks 1, 2 and N. The write information control circuit 8 further includes AND gates A, B, C –N corresponding to tracks 1, 2, 3 –N, respectively. The information signals $IF_1$, $IF_2$, $IF_3$ –$IF_N$ to be written upon the tracks 1, 2, 3 -- N respectively, are applied to a first input terminal of the AND gates of the circuit 8 and are read out to be recorded by gating or sampling signals generated in a conventional manner and applied through a line 902 to the other input of the AND gates. Thus, the tape mark block consisting of the first and second tape mark bytes will be generated upon the magnetic tape at a selected interval after the application of the tape mark instruction to the circuit of FIG. 6 and the resultant driving of the tape.

Figure 10:
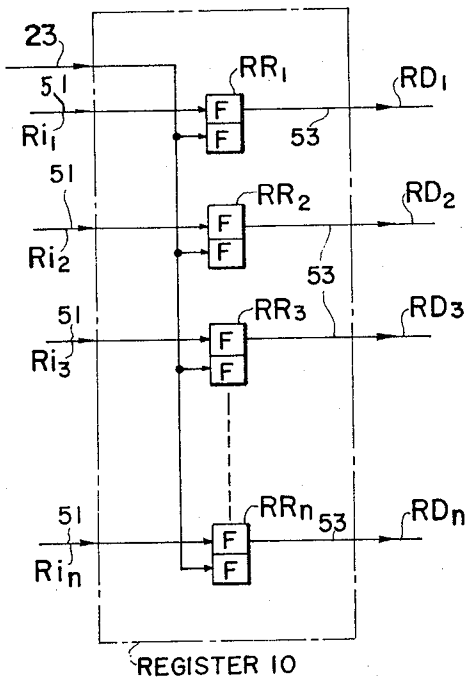
FIG. 10 is a schematic representation of a detailed embodi-ment of the register 10 incorporated into the circuit shown in FIG. 6.

After the tape mark block has been written or stored upon the magnetic tape, the written tape mark block will be read by a plurality of read heads (not shown) associated with the tape transport to generate a plurality of read data signals $Ri_1$, $Ri_2$, $Ri_3$–$Ri_N$, which are applied along a corresponding plurality of conductive paths collectively identified by the numeral 51, to a register 10. As shown in FIG. 10, the register 10 includes a plurality of flip flops $RR_1$, $RR_2$, $RR_3$ -- $RR_N$ to be set respectively by the aforementioned signals. A sampling signal is generated by an interlock gap (IBG detection circuit 14, and is applied along a conductive path 23 to reset each of the flip flops $RR_1$, $RR_2$, $RR_3$ – $RR_N$. Upon being set, these aforementioned flip flops developed signals $RD_1$, $RD_2$, $RD_3$ – $RD_N$ corresponding to each of the tracks of the magnetic tape, which signals are applied by a plurality of conductive paths indicated collectively by the numeral 53 to the IBG detection circuit 14 and also to an error detection circuit 11.

Figure 11:
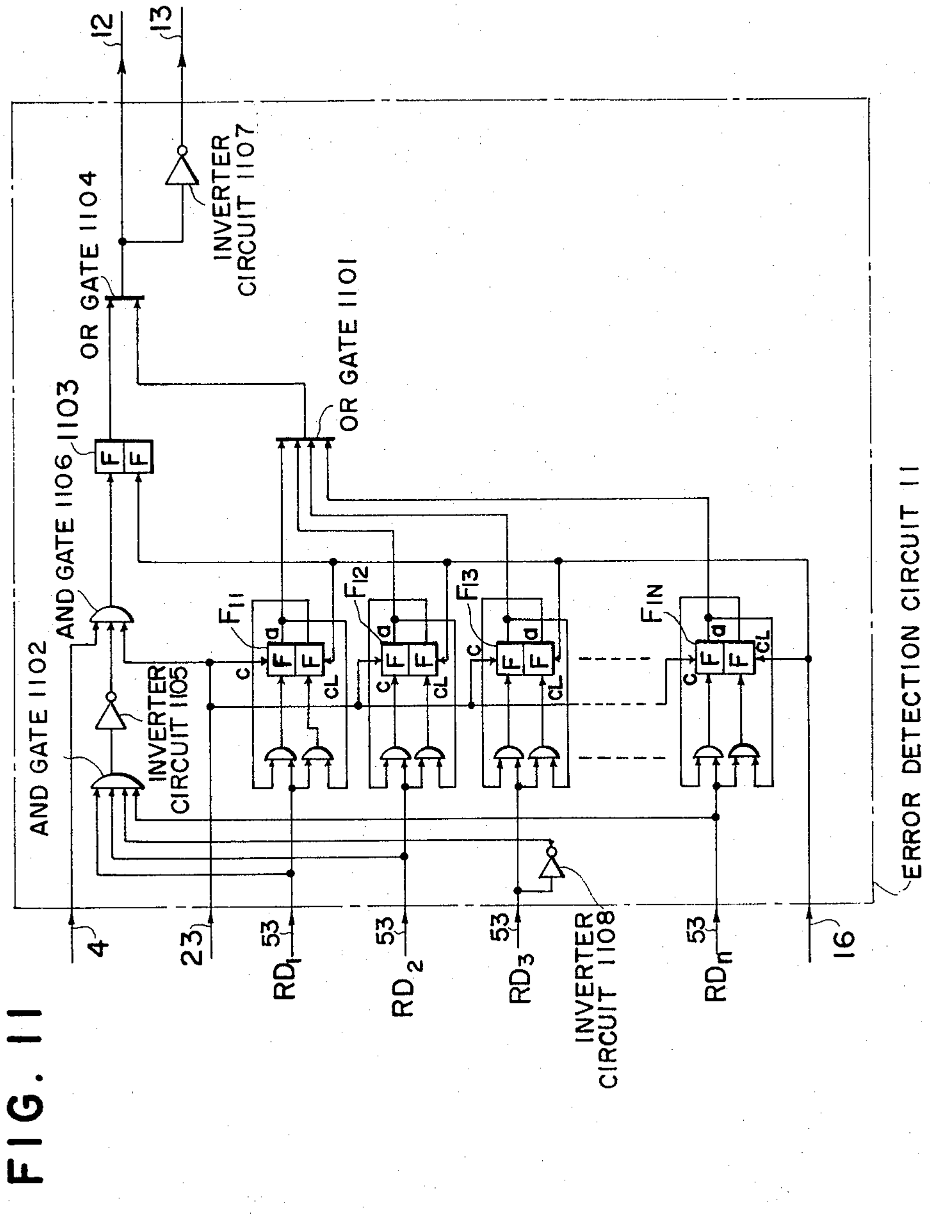
FIG. 11 is a schematic representation of a detailed embodi-ment of the error detection circuit 11 as incorporated in the circuit of FIG. 6.

With reference to FIG. 6, the error detection circuit 11 responds to the read data signals $RD_1$, $RD_2$, $RD_3$ – $RD_N$ to determine whether the tape mark block has been correctly written and read from the magnetic tape. More specifically, the error detection circuit 11 responds to an error tape mark condition by generating and applying a logic 1 signal to a conductive path 12 and in the absence of such tape mark error condition will generate and apply a logic 1 signal to a conductive path 13. With regard to FIG. 11, an illustrative embodiment of the error detection circuit 11 is shown as including a plurality of flip flops $F_{11}F_{12}$, – $F_{1N}$ for receiving and storing each of the gated read data signals $RD_1$, $RD_2$ – $RD_N$. Each aforementiioned flip flop will operate as an independent counter to indicate the receipt of both the first and second tape mark bytes. More specifically, a sampling pulse is generated by the IBG detection circuit 14 and applied through the conductive path 23 to the clock terminals C of each of the flip flops $F_{11}$, $F_{12}$ – $F_{1N}$. As a result, the sampled read data signals will reverse the state of the flip flop to which it is applied from its previous state, upon generation of the sampling pulse applied to its clock terminal C. As previously explained, the first and second bytes of the tape mark block contain binary 1's in the bits corresponding to the first, second and N tracks. As will be explained later, each of the flip flops $F_{11}$, $F_{12}$, – $F_{1N}$ will be recleared by a signal generated by an AND gate 52 and applied through a conductive path 16 to the clear input terminals CL of each of the aforementioned flip flops. With each of these flip flops initially in a cleared condition, the successive 1-bits of the first and second tape mark bytes will successively set and reset the flip flop $F_{11}F_{12}$ and $F_{1N}$, so that the flip flops $F_{11}$, $F_{12}$, and $F_{1N}$ will be disposed in a logic 0 condition after reading all the data of a tape mark block. It is noted that the other sampled read data signals (other than $RD_1$, $RD_2$ and $RD_N$) will be in this illustrative embodiment of the tape mark block 0 bits and the logic condition of the flip flops $F_{13}$ to $F_{1(N-1)}$ will remain in the logic 0 condition. As shown in FIG. 11, the terminal "a" of each of the flip flops $F_{11}F_{12}$, – $F_{1N}$ is connected to an input terminal of an OR gate 1101. Thus, if the tape mark block has been accurately written and read, the aforementioned flip flops will each remain in its 0 logic condition and the OR gate 1101 will generate a 0 signal. However, if an error in the tape mark block is detected, one of the aforementioned flip flops will not be converted back to its logic 0 condition and the OR gate 1101 will generate and apply a logic 1 signal to an OR gate 1104.

Whether the sampled read data signals $RD_1$, $RD_2$, $RD_3$ – $RD_N$ are the coded signals corresponding to the tape mark block, will be determined by an AND gate 1102. In the illustrative embodiment of the tape mark block shown in FIG. 2, the sampled read data signals $RD_1RD_2$, and $RD_{DN}$ are applied directly to the input terminals of the AND gate 1102, whereas the remaining data signals are applied through inverter circuits and as an inverter circuit 1108 to the AND gate 1102. Thus, if the tape mark block is not being read, the condition of the AND gate 1102 will not be satisfied and the AND gate 1102 will generate a "0" logic signal which will be inverted by an inverter circuit 1105 and applied to an input terminal of an AND gate 1106. Thus, upon the application of a sampling pulse derived from the IBG detection circuit 14 and applied along the conductive path 23 to an input terminal of the AND gate 1106, the AND gate 1106 will generate a logic 1 signal to set a flip flop 1103. As indicated in FIG. 11, the flip flop 1103 is reset by the signal applied along the conducted path 16. Thus, a check is performed to both the first tape mark byte and the second or redundant tape mark byte and if either tape mark byte is not present, the flip flop 1103 will be set and the OR gate 1104 will apply a logic 1 signal to the conductive path 12. Thus, two checks of the tape block mark are made; the first check performed by the aforementioned flip flops insures that both the first and second tape mark bytes are recorded and the second check performed by the AND gate 1102 insures that each bit of the tape mark bytes is recorded and read correctly. As a result of both of these checks, the OR gate 1104 will generate when a tape mark error condition has been sensed, a logic 1 signal upon the conductive path 12. As indicated in FIG. 11, an inverter circuit 1107 applies when a tape mark error condition has been sensed a 0 logic signal to the conductive path 13. Conversely, if no tape mark error condition is sensed, a logic 1 signal will be applied to the conductive path 13 and a logic 0 signal will be applied to the conductive path 12.

Referring to FIG. 6, the sampled read data signals $R_{D1}$, $R_{D2}$ – $R_{DN}$ are also applied to the interblock gap (IBG) detection circuit 14. The IBG detection circuit 14 generates a timing pulse to be applied through the conductive path 23 to the error detection circuit 11 and also to the register 10 whereby one byte of the stored data signals may be sampled at a time. As explained above, the pulse generated by the IBG detection circuit 14 serves to reset the register 10. Further, the IBG detection circuit 14 senses the time interval between the read data signals and generates an interblock gap (IBG) detection pulse upon a conductive path 15, when no data signals have been read for a predetermined length of time.

Figure 12:
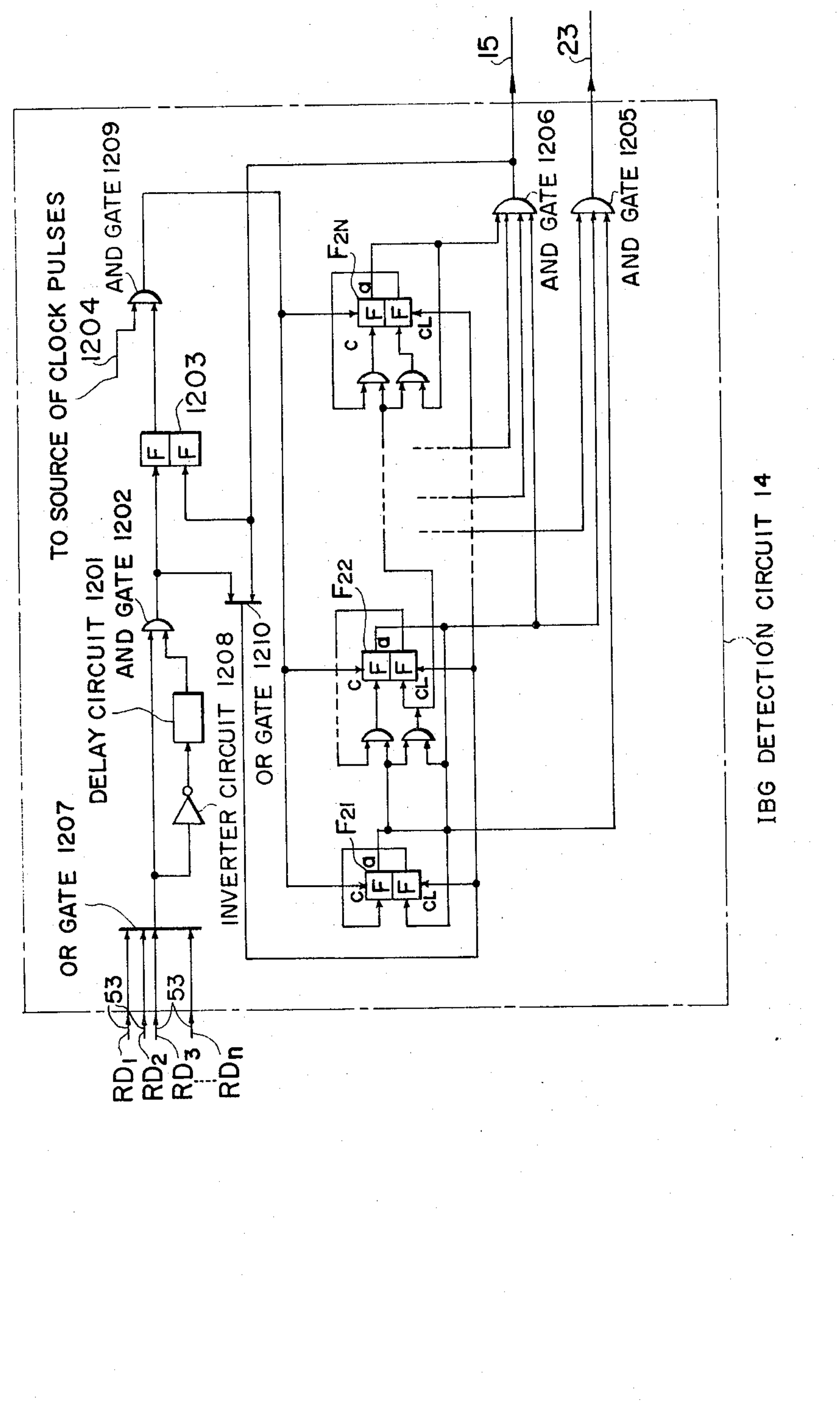
FIG. 12 is a schematic representation of a detailed embodi-ment in the interblock gap IBG detection circuit 14 as incorporated in the circuit of FIG. 6.

In FIG. 12, there is shown the detailed circuit of an illustrative embodiment of the IBG detection circuit 14 incorporated into the circuit shown in FIG. 6. The sampled, read data signals $R_{D1}$, $R_{D2}$–$R_{DN}$ are applied through the plurality of conductors 53 to an OR gate 1207. The rise of the first received signal by the OR gate 1207, will cause the OR gate 1207 to generate an appropriate signal to be applied to a first input terminal of an AND gate 1202, and through an inverter circuit 1208 and a delay circuit 1201 to the other input terminal of the AND gate 1202 after a delay determined by the circuit 1201, the AND gate 1202 will generate a signal to set a flip flop 1203. As indicated in FIG. 12, the IBG detection circuit 14 includes a plurality of flip flops $F_{21}$, $F_{22}$ – $F_{2N}$, each of which is connected by an AND gate 1204 to a source of fixed period clock pulses applied to a conductive path 1204. Thus, the flip flops $F_{21}$, $F_{22}$ – $F_{2N}$ serve as counters to count the number of clock pulses derived from the conductive path 1204, during that period of time that flip flop 1203 has been reset, i.e., has been disposed in a logic 1 condition. As indicated in FIG. 12, the output terminals of the flip flops $F_{21}$, $F_{22}$, – $F_{2N}$ are appropriately connected to AND gates 1205 and 1206 which serves as decoders. When a data block is being read, the flip flops $F_{21}$, $F_{22}$ – $F_{2N}$ will be cleared by a signal generated by the AND gate 1202 and applied through an OR gate 1210 to the clear input terminal CL of each of the aforementioned flip flops; as a result, these flip flops will be cleared by each character and will be newly counted. When the read signals corresponding to an interblock gap, i.e., the read head is disposed at an interblock gap, the AND gate 1202 will cease generating a clear signal and the flip flops $F_{21}$, $F_{22}$ – $F_{2N}$ will continue to count the clock pulses applied to their input terminals C without being cleared. As a result, the flip flops shown in FIG. 12 will be successively set until the conditions of the AND gates 1205 and 1206 have been met. At this point, the AND gate 1206 will generate an IBG detection pulse to be applied through a conductive path 15 to the AND gate 52 and also to apply a sampling pulse to the conductive path 23. Further, the flip flop 1203 will be reset by the pulse applied to the conductive path 15.

With reference to FIG. 6, when no tape mark error has been detected, the error detection circuit 11 will generate as explained above a logic 1 signal to be applied through the conductive path 13 to the AND gate 54, which in turn generates and applies a pulse through the conductive path 21 and the OR gate 42 to the *b* input terminal of the flip flop 5, whereby the flip flop 5 is reset. Upon being reset, the flip flop 5 will no longer generate the drive signal to be applied to the tape transport mechanism and the tape mark write instruction will be completed. On the other hand, when a tape mark error condition is detected, the error detection circuit 11 operates as explained above to apply a logic 1 signal through the conductive path 12 to the AND gate 52. In response thereto, the AND gate 52 generates a pulse through the conductive path 16 to the "b" input terminal of the direction indicating flip flop 6, thereby resetting flip flop 6 and directing the tape transport to drive the magnetic tape in a reverse or second direction. The pulse generated by the AND gate 52 is also applied by the conductive path 16 to the flip flop 17, thereby resetting flip flop 17, and also to one input terminal of an AND gate 56 to initiate the operation of a monostate multivibrator 18. As indicated in FIG. 6, one output terminal from the monostable multivibrator 18 is connected through a delay circuit 58 to a first input terminal of an AND gate 60, whereas the other output terminal of the monostable multivibrator 18 is connected to the second input terminal of the AND gate 60. The monostable multivibrator determines the interval of time in which the magnetic tape will be directed in the reverse direction and upon termination of this interval will cause the AND gate 60 to generate a pulse through the conductive path 19 and the OR gate 40 to the *a* input terminal of the direction indicating flop 6, thereby setting flip flop 6. As a result, the tape transport will then drive the magnetic tape in the first forward direction. The pulse generated by the AND gate 60 is also applied to the counting circuit 7, thereby disposing the counting circuit 7 in its drive status. After a period of time determined by the counting circuit 7, a pulse is generated thereby through the conductive path 9 to cause the write information control circuit 8 to write a tape mark block in a manner explained above upon the magnetic tape. It is noted that the pulse derived from the counting circuit 7 is generated sufficiently later than that pulse applied to the flip flop 6, to permit the tape mark block to be recorded upon the magnetic tape after the tape transport has started to move this tape in the forward direction, due to the setting of the flip flop 17. As a result, the magnetic tape will be driven for a first predetermined length thereof before the second tape mark block is written onto the magnetic tape. As mentioned in the explanation of FIG. 5, the tape mark block generating the error, is erased and the writing of the second tape mark block is performed to avoid that portion of the magnetic tape where the erroneous tape mark block was recorded.

The pulse generated by the AND gate 52 is also applied to a tape reverse counter 20 which counts the number of times that the magnetic tape is recycled in order to correct the erroneous tape mark block. As indicated in FIG. 6, the tape reverse counter 20 includes a plurality of flip flops $F_{31}$, $F_{32}$, and $F_{33}$, each of which is connected to the AND gate 52. When a tape mark block is written normally within a specified number of cycles (e.g., eight cycles in this illustrative embodiment), the AND gate 54 will respond to the no-error signal received upon the conductive path 13 and a pulse will be generated through the conductive path 21 and the OR gate 42 to reset the flip flop 5, thereby completing the write tapemark instruction. In addition, the pulse generated by the AND gate 54 will be applied to each of the clear input terminals C of the flip flops $F_{21}$, $F_{32}$, and $F_{33}$, thereby clearing these flip flops. However, when a tape mark block cannot be written within a specified number of recyclings, an output signal will be generated by the tape reverse counter 20 and applied through a conductive path 66 to the first input terminal of an AND gate 62. The other input to the AND gate 62 is derived from the AND gate 52 in response to the detection of a tape mark block error condition. When the conditions of the AND gate 62 are met, a pulse is generated through the conductive path 22 to set flip flop 25, thereby providing a signal upon a conductive path 24, indicating the systems (units) failure. In addition, the pulse generated by the AND gate 62 is applied through the OR gate 42 to reset the flip flop 5. The counting circuit 7 will be internally cleared after every cycle, but the tape reverse counter 20 will hold its counting state and will count an additional 1 for every recycle in this series of operations.

In the illustrative embodiment of this invention shown in FIG. 6, an information processing system is disclosed for use with a magnetic tape control unit and a magnetic tape transport; but it will be understood that there will be no change in this invention if the circuit of the magnetic tape control unit would be included within the magnetic transport unit.

Though an illustrative embodiment of this invention has been explained above with the regard to the drawings, numerous modifications and adaptations of the system of this invention will be apparent to those skilled in the art and thus it is intended by the attached claims to cover all such modifications and adaptations as intended to be within the true scope of the invention.

What is claimed is:

1. An error processing system for use with reversible transport means for moving selectively a magnetic tape in a first direction and in a second direction opposite to the first direction, the transport means including read-write means for recording the data in the form of bytes each including a plurality of bits on a corresponding plurality of tracks of the magnetic tape, and for reading data from the magnetic tape to provide signals indicative of the bits recorded thereon, the information bytes being recorded in the form of a data block and a tape mark block with an interblock gap disposed therebetween, said error processing system comprising:

a. an instruction register responsive to an instruction signal derived from an information processing unit for generating a write initiate signal;

b. tape drive control means comprising memory means operative in a first state in response to the write initiate signal to effect movement of the magnetic tape in the first direction and in a second state to effect movement of the magnetic tape in the second direction, and counting circuits coupled to said instruction register for providing a timing pulse at a selected interval of time after the generation of the write initiate signal;

c. write control means responsive to the delayed timing pulse for providing a first write tape mark signal whereby the read-write means records a first tape mark block at a first position on a magnetic tape, while said tape drive control means is disposed in its first state to effect movement of the magnetic tape in the first direction;

d. error check means responsive to the signals read by the read-write means corresponding to the recorded first tape mark block, for providing an error signal upon the occurrence of a tape mark error condition; and e. error correcting means responsive to the error signal for first disposing said tape drive control means in a second state whereby the magnetic tape is moved in the second direction while erasing this portion of the magnetic tape, and for then initiating the operation of said control means to provide a second write tape mark signal after a predetermined interval whereby a second tape mark block is written on a second position of the magnetic tape displaced from the first position.

2. An error processing system as claimed in claim 1 wherein said write control means is responsive to the delayed timing pulse for applying to the read-write means the write tape mark block signal whereby a tape mark block comprising a first tape mark byte and a second, redundant tape mark byte are recorded upon the magnetic tape.

3. An error processing system as claimed in claim 2, wherein said error check means includes a register for receiving and storing from the read-write means, read data signals corresponding to the recorded tape mark block.

4. An error processing system for use with reversible transport means for moving selectively a magnetic tape in the first direction and in a second direction opposite to the first direction, the transport means including read-write means for recording the data in the form of bytes each including a plurality of bits on a corresponding plurality of tracks of the magnetic tape, and for reading from the magnetic tape to provide signals indicative of the bits recorded thereon, the information bytes being recorded in the form of a data block and a tape mark block with an interblock gap disposed therebetween, the tape mark block comprising first and second tape mark bytes, each comprising the same selected bits, said error processing system comprising:

a. tape drive control means selectively disposal on a first state to operate the transport means to drive the magnetic tape in the first direction and in a second state to operate the transport means to drive the magnetic tape in the second direction;

b. write control means for providing a first write tape mark block signal whereby the read-write means records a first tape mark block at a first position on the magnetic tape, while said tape drive control means is disposed in its first state to effect movement of the magnetic tape in the first direction;

c. error check means responsive to the signals read by the read-write means corresponding to the recorded first tape mark block, for providing an error signal upon the occurrence of a tape mark error condition, and including interblock gap detection means responsive to the signals read by the read-write means for providing an interblock gap signal indicative of the absence of read data signals for a predetermined length of time, an error detection circuit for detecting the presence of each selected bit of the first and second bytes and for providing the aforementioned error signals in the absence of at least one bit thereof, and an AND gate means responsive to the error signal and to the interblock gap signal for providing a coincidence signal; and d. error correcting means responsive to the error signal for first disposing said tape drive control means in its second state whereby the magnetic tape is moved in the second direction while erasing this portion of the magnetic tape, and for then initiating the operation of said write control means to provide a second write tape mark signal after a predetermined interval whereby a second tape mark block is written on a second position of the magnetic tape displaced from the first position.

5. An error processing system for use with reversible transport mens for moving selectively a magnetic tape in a first direction and in a second direction opposite to the first direction, the transport means including read-write means for recording the data in the form of bytes each including a plurality of bits on a corresponding plurality of tracks of the magnetic tape, and for reading data from the magnetic tape to provide signals indicative of the bits recorded thereon, the information bytes being recorded in the form of a data block and a tape mark block with interblock gap disposed therebetween, said error processing system comprising:

a. tape drive control means selectively disposable in a first state to operate the transport means to drive the magnetic tape in the first direction and in a second state to operate the transport means to drive a magnetic tape in the second direction;

b. write control means for providing a first write tape mark block signal whereby the read-write means records a first tape mark block at a first position on a magnetic tape, while said tape drive control means is disposed in its first state to effect movement of the magnetic tape in the first direction;

c. error check means responsive to the signals read by the read-write means corresponding to the recorded first tape mark block, for providing an error signal upon the occurrence of a tape mark error condition;

d. error correcting means responsive to the error signal for first disposing said tape drive control means in its second state whereby the magnetic tape is moved in a second direction while erasing this portion of the magnetic tape, and then for initiating the operation of said write control means to provide a second write tape mark signal after a predetermined interval whereby a second tape mark block is written on a second position of the magnetic tape displayed from the first position, said error correcting means providing a write initiate signal after the first mentioned predetermined interval to said tape drive control means thereby disposing said tape drive control means in its first state and effecting the movement of a magnetic tape in the first direction; and e. a counting circuit responsive to the write initiate signal to energize said write control means, whereby a second tape mark block is written upon the magnetic tape a second interval after the initiation of the movement of the magnetic tape in the first direction, the second interval being determined by said counting circuit.

6. An error processing system for use with reversible transport means for moving selectively a magnetic tape in a first direction and in a second direction opposite to the first direction, the transport means including read-write means for recording the data in the form of bytes each including a plurality of bits on a corresponding plurality of tracks of the magnetic tape, and for reading data from the magnetic tape to provide signals indicative of the bits recorded thereon, the information bytes being recorded in the form of a data block and a tape mark block with an interblock gap disposed therebetween, said error processing system comprising:

a. tape drive control means selectively disposable in a first state to operate the transport means to drive the magnetic tape in the first direction and in a second state to operate the transport means to drive the magnetic tape in the second direction;

b. write control means for providing a first write tape mark block signal whereby the read-write means records a first tape mark block at a first position on the magnetic tape, while said tape drive control means is disposed in its second state to effect movement of the magnetic tape in the first direction;

c. error check means including a plurality of memory means coupled to receive the read data signals corresponding to a recorded tape mark block having first and second bytes each having selected bits therein, each of said memory means disposable in a first state in response to the receipt of the selected bits of the first byte and disposable in a second state in response to receipt thereafter of the selected bits in the second byte, and first coincidence means responsive to the receipt of the selected bits of the first and second bytes to provide a coincidence signal, said error check means providing an error signal in response to the occurrence of both the coincidence signal and the disposition of said plurality of said memory means to their second states; and d. error correcting means responsive to the error signal for first disposing said tape drive control means in its second state whereby the magnetic tape is moved in the second direction while erasing this portion of the magnetic tape, and for then initiating the operation of said write control means to provide a second write tape mark signal after a predetermined interval whereby a second tape mark block is written on a second position of the magnetic tape displaced from the first position.

* * * * *